United States Patent [19]

Fillmann

[11] Patent Number: 4,542,054
[45] Date of Patent: Sep. 17, 1985

[54] MOLDED COMPOSITE POLYMERIC BODY WITH ANTI-STATIC PROPERTIES AND PROCESS FOR MAKING SAME

[75] Inventor: Werner Fillmann, Hilchenbach, Fed. Rep. of Germany

[73] Assignee: Battenfeld Maschinenfabrik GmbH, Meierzhagen, Fed. Rep. of Germany

[21] Appl. No.: 541,682

[22] Filed: Oct. 13, 1983

[30] Foreign Application Priority Data

Oct. 14, 1982 [DE] Fed. Rep. of Germany ....... 3238090

[51] Int. Cl.⁴ .................... B32B 3/00; B32B 5/16; B32B 5/18; B32B 5/30
[52] U.S. Cl. .................... 428/68; 264/45.3; 264/46.6; 264/328.12; 428/71; 428/148; 428/309.9; 428/317.9; 428/328; 428/922
[58] Field of Search ............ 264/45.1, 45.3, 46.4, 264/46.6, 55, 328.12; 428/218, 219, 309.9, 310.5, 313.9, 317.9, 318.6, 328, 420, 68, 76, 144, 148, 329, 922, 71

[56] References Cited

U.S. PATENT DOCUMENTS

| | | | |
|---|---|---|---|
| 3,565,685 | 2/1971 | Suzuki | 428/328 |
| 3,873,656 | 3/1975 | Garner | 428/318.6 |
| 4,045,603 | 8/1977 | Van Smith | 428/144 |
| 4,208,696 | 6/1980 | Lindsay | 428/319.7 |
| 4,215,170 | 7/1980 | Oliva | 428/328 |
| 4,231,901 | 11/1980 | Berbeco | 428/317.9 |
| 4,258,100 | 3/1981 | Fujitani et al. | 428/317.9 |
| 4,307,144 | 12/1981 | Sanders et al. | 428/922 |
| 4,308,226 | 12/1981 | Wingard | 264/45.3 |

*Primary Examiner*—William J. Van Balen
*Attorney, Agent, or Firm*—Karl F. Ross; Herbert Dubno

[57] ABSTRACT

A body of polymeric material, comprising a core—e.g. of foam plastic—surrounded by a skin of greater density, includes a filler of metallic or other electrically conductive particles distributed throughout the core or at least in an intermediate layer separating an inner part of the core from the skin. The filler particles, preferably consisting of iron or aluminum, are injected together with all or part of the core material during the molding of the body.

19 Claims, 4 Drawing Figures

MOLDED COMPOSITE POLYMERIC BODY WITH ANTI-STATIC PROPERTIES AND PROCESS FOR MAKING SAME

FIELD OF THE INVENTION

My present invention relates to a molded composite body, essentially consisting of two polymeric materials, as well as to a process for making same.

BACKGROUND OF THE INVENTION

Polymeric bodies of the type here considered include a core and a surrounding skin, the latter being usually denser than the former; thus, the polymeric core may be admixed with a foaming agent. The two constituents may be formed in separate molds though in many instances it is possible to produce them in a common mold cavity by successive injection steps.

When such a composite body is used in an environment containing sensitive electronic equipment, e.g. as pads or mats for the support of electrically operated office machines, the accumulation of static charges thereon must be prevented. For this purpose it is known in provide such bodies with an electronic shield or with inductive protection means; in particular, a metallic foil may be pasted onto an inner surface of the body or a thin layer of metallic powder may be sprayed upon that surface. Both procedures encumber the manufacturing process; the second one also entails the risk that some metal particles might land on the outer skin and mar its appearance or impair its continuity, thereby rendering the article unusable.

OBJECTS OF THE INVENTION

An important object of my present invention, therefore, is to provide an improved composite body of the character described which has the requisite anti-static properties while avoiding the drawbacks referred to. A related object is to provide a process for expeditiously producing such a composite body.

SUMMARY OF THE INVENTION

A polymeric body according to my present invention, designed to realize the first-mentioned object, comprises a filler of electrically conductive particles which are distributed in the interior of the body, either throughout the core or at least along its boundary with the skin, i.e. throughout an interface of the skin and the core. In the latter case the particles may be imbedded in a layer of core material or, possibly, of skin material as long as the homogeneity of the skin itself is not violated.

The conductive particles preferably consist of metal, e.g. iron or aluminum, though they could also consist of carbon. For full anti-static effectiveness they ought to be present in a proportion of at least 50%, by weight, of the mass of which they form part, i.e. of the entire core or of the interface layer referred to.

In order to produce such a composite body, with a skin of a first polymeric material and a core of a preferably less dense second polymeric material, a process according to my invention comprises the steps of injecting the first polymeric material into a mold cavity in a quantity sufficient to form the skin, injecting the second polymeric material into the same cavity in a quantity sufficient to occupy the rest of its volume, and admixing a filler of electrically conductive particles with the second polymeric material during at least part of its injection.

In order to attain the aforementioned proportion of at least 50% by weight, I prefer to choose the amount of filler at least equal (by weight) to that of the accompanying polymeric material—including the foaming agent, if any, admixed therewith—during their simultaneous injection.

BRIEF DESCRIPTION OF THE DRAWING

The above and other features of my invention will now be described in detail with reference to the accompanying drawing in which.

SPECIFIC DESCRIPTION

Figure 1:
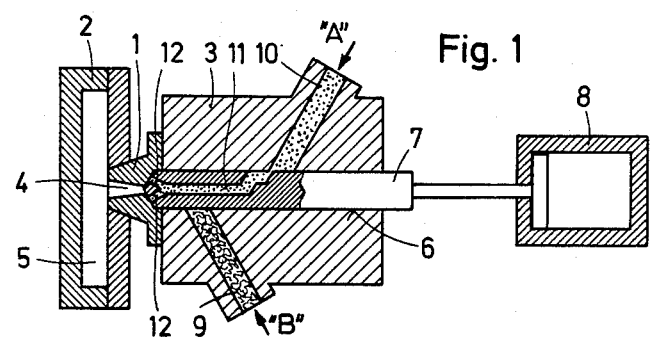
FIG. 1 is a somewhat diagrammatic axial sectional view of a mold cavity and an associated injection system designed to produce a composite body according to my invention.
Figure 2:
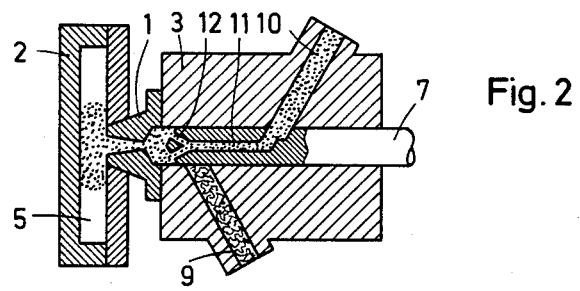
FIGS. 2–4 are views similar to FIG. 1, showing different phases of operation.

As shown in the drawing, an injection nozzle 1 has an orifice 4 opening onto a cavity 5 of a two-part mold 2. Nozzle 1 is mounted on a block 3 in line with a channel 6 thereof in which a gating pin 7 is slidable by means of a hydraulic jack 8 whose operation is controlled by a nonillustrated timer. Block 3 has two ports 9 and 10 communicating with channel 6 at respective locations closer to and farther from nozzle 1. Gating pin 7 has an internal passage 11 terminating at its rear end in a lateral access opening which in certain positions, as more fully described hereinafter, registers partly or entirely with the port 10 for receiving a homogeneous thermoplastic material "A" under pressure from a nonillustrated source, e.g. an extruder. The front end of passage 11 forms several branches 12 which in the fully inserted position of pin 7, shown in FIG. 1, are obstructed by the nozzle 1 but which in other positions of that pin communicate with nozzle orifice 4. Port 9, blocked by the pin 7 in the positions of FIGS. 1 and 2, is connected to another such source which supplies a thermoplastic material "B" containing a foaming agent as well as a filler of electrically conductive—preferably metallic—particles uniformly distributed therethrough, specifically iron powder. Material "B" is of greater viscosity than the nonfoamable material "A".

Figure 3:
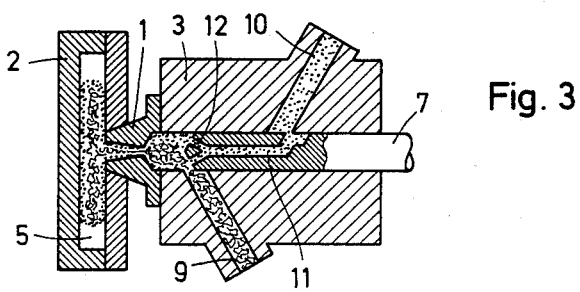
Figure 4:
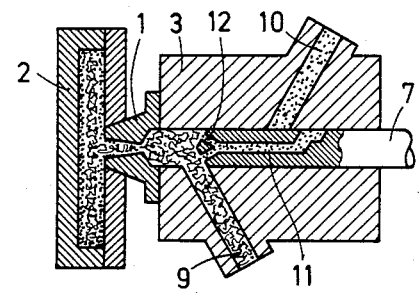

In the initial position of FIG. 1, passage 11 is blocked at its front end but partially communicates at its rear end with port 10 so as to be filled completely with the homogeneous thermoplastic material "A" designed to form the skin of a composite body to be molded. When the pin 7 is partly retracted as shown in FIG. 2, port 10 is fully open toward passage 11 whose outlets 12 are unblocked so that the material "A" enters the cavity 5 and occupies part of its volume. Next, as seen in FIG. 3, pin 7 is further retracted to unblock the port 9 while partly cutting off the port 10 whereby a mixture of materials "A" and "B" flows into the cavity 5, with the more viscous substance "B" forming a coherent mass within the resin "A" already present in that cavity. In its fully retracted position, FIG. 4, port 10 is blocked while port 9 is wide open to fill up the remainder of the cavity volume with the particle-containing material "B". With the injection pressure suitably regulated, the foaming agent in mass "B" causes its expansion with formation of bubbles as seen in FIGS. 3 and 4.

When the operation of jack 8 is reversed by the timer, it re-extends the pin 7; the pin then successively traverses the positions of FIG. 3 and FIG. 2 before returning to the starting position of FIG. 1. During this traverse, therefore, skin material "A" is again admixed with the core material "B" until the flow of the latter is terminated in the position of FIG. 2 whereby a sprue formed in orifice 4 completes the molding of the outer skin of the workpiece. The mold 2 is then opened and, after ejection of the workpiece, is reclosed to begin a new cycle.

The described mode of operation relates to the molding of a composite body such as a mat whose core is in the form of a relatively thin layer throughout which the conductive filler particles are uniformly distributed. In the molding of articles with thicker cores it may be desirable to admix the conductive particles with the thermoplastic core material only during part of the injection of the latter, i.e. in a first phase in which that material forms an interface layer in a peripheral zone adjoining the developing skin. It is also possible to produce such an interface layer from a mixture of skin material "A" with conductive filler; in such a case, however, it may be necessary to complete the formation of the skin in a first molding stage, to be followed by further stages for producing the interface layer and the core.

It will be apparent that my invention is also applicable to composite bodies whose cores consist of a nonfoaming resinous material which preferably is less dense and more yieldable than the surrounding skin.

The synthetic resins used for the skin and the core could be the same kind of polymer (e.g. a polyurethane), distinguished only by the presence of foaming agent in the case of the core, but could also be mutually different.

I claim:

1. A composite polymeric body comprising a homogeneous skin of a first polymeric material surrounding a core of a second polymeric material, and a filler of electrically conductive particles distributed at least throughout an interface of said skin and said core in a thin antistatic electronic shielding and induction protection layer bounded by said skin.

2. A body as defined in claim 1 wherein said particles are admixed with said second polymeric material.

3. A body as defined in claim 2 wherein said second polymeric material contains a foaming agent.

4. A body as defined in claim 2 wherein said particles are contained only in a peripheral zone of said core.

5. A body as defined in claim 2 wherein said particles are present in at least a layer of said second polymeric material in a proportion of at least 50% by weight of said layer of said second polymeric material.

6. A body as defined in claim 1 wherein said particles consist of metal.

7. A body as defined in claim 6 wherein said metal is iron.

8. A body as defined in claim 6 wherein said metal is aluminum.

9. A process for molding a body with a skin formed from a homogeneous first polymeric material surrounding a core formed from a homogeneous second polymeric material, comprising the steps of injecting said first polymeric material into a mold cavity in a quantity sufficient to form said skin, injecting said second polymeric material into said mold cavity in a quantity sufficient to occupy the rest of the cavity, and admixing a filler of electrically conductive particles with said second polymeric material during at least part of the injection thereof to form a thin antistatic electronic shielding and induction protection layer bounded by said skin.

10. A process as defined in claim 9 wherein the injection of said second polymeric material together with said filler takes place immediately after the injection of said first polymeric material.

11. A process as defined in claim 10 wherein a partial injection of said first polymeric material is followed by an injection of the entire second polymeric material together with said filler, followed by an injection of the balance of said first polymeric material.

12. A process as defined in claim 9 wherein said filler is injected together with said second polymeric material in a proportion of at least 1:1 by weight.

13. A process as defined in claim 9 wherein said particles are metallic.

14. A process as defined in claim 13 wherein said particles consist of iron.

15. A process as defined in claim 13 wherein said particles consist of aluminum.

16. A process as defined in claim 9 wherein said first polymeric material is denser than said second polymeric material.

17. A process as defined in claim 16 wherein said second polymeric material contains a foaming agent.

18. A process as defined in claim 9 wherein said second polymeric material is more viscous than said first polymeric material.

19. A process as defined in claim 18 wherein said second polymeric material contains a foaming agent expanding upon injection into said cavity.

* * * * *